(12) United States Patent
Kasprzyk et al.

(10) Patent No.: US 11,835,108 B2
(45) Date of Patent: Dec. 5, 2023

(54) HYDRAULIC DAMPER WITH A HYDRAULIC COMPRESSION STOP ASSEMBLY

(71) Applicant: BeijingWest Industries Co., Ltd., Beijing (CN)

(72) Inventors: Dominik Kasprzyk, Debica (PL); Mateusz Szymon Sarapata, Wysoka (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 17/671,573

(22) Filed: Feb. 14, 2022

(65) Prior Publication Data

US 2022/0333664 A1    Oct. 20, 2022

(30) Foreign Application Priority Data

Apr. 14, 2021 (CN) .......................... 202110399636.8

(51) Int. Cl.
*F16F 9/49* (2006.01)
*F16F 9/18* (2006.01)
*F16F 9/34* (2006.01)

(52) U.S. Cl.
CPC ............... *F16F 9/49* (2013.01); *F16F 9/185* (2013.01); *F16F 9/3405* (2013.01);
(Continued)

(58) Field of Classification Search
CPC .. F16F 9/49; F16F 9/185; F16F 9/3405; F16F 2230/42; F16F 2234/02; F16F 2234/04
See application file for complete search history.

(56) References Cited

U.S. PATENT DOCUMENTS 4,166,612 A   9/1979  Freitag et al.
4,386,766 A   6/1983  Hauer et al.
(Continued)

FOREIGN PATENT DOCUMENTS

DE   29910104 U1   7/2000
EP   3244090 B1    12/2018
(Continued)

OTHER PUBLICATIONS

Extended European Search Report dated Sep. 16, 2022 for counterpart European patent application No. 22167578.8.

*Primary Examiner* — Thomas W Irvin
(74) *Attorney, Agent, or Firm* — William H. Honaker; DICKINSON WRIGHT PLLC

(57) ABSTRACT

The present invention relates to a hydraulic damper comprising a main tube; a main piston assembly; a base valve assembly; and a hydraulic compression stop assembly comprising an insert fixed on the base valve assembly, and an additional piston assembly apt to be introduced inside the first inner chamber of the insert at the end of the damper compression stroke to generate additional damping force. Said additional piston assembly comprises a piston rod extender fixed to the piston assembly or the piston rod at the side of the compression chamber, and a tenon fixed to said piston rod extender and radially displaceable with regard thereto, wherein said tenon is terminated with a first entry surface having diameter monotonically diminishing towards the compression end of said tenon, while the insert is provided with a second entry surface having diameter monotonically increasing towards the rebound end of the insert.

12 Claims, 4 Drawing Sheets

(52) U.S. Cl.
CPC ....... *F16F 2230/42* (2013.01); *F16F 2234/02* (2013.01); *F16F 2234/04* (2013.01)

(56) References Cited

U.S. PATENT DOCUMENTS

| | | | |
|---|---|---|---|
| 5,702,091 A | 12/1997 | Perrin et al. | |
| 9,605,726 B2 | 3/2017 | Baldoni et al. | |
| 10,107,352 B2* | 10/2018 | Grzesik | F16F 9/585 |
| 10,174,802 B2* | 1/2019 | Osika | B60G 13/08 |
| 10,746,252 B2* | 8/2020 | Flacht | F16F 9/34 |
| 10,876,591 B2* | 12/2020 | Mallin | F16F 9/5126 |
| 11,187,298 B2* | 11/2021 | Mallin | F16F 9/49 |
| 11,320,017 B2* | 5/2022 | Bielak | F16F 9/585 |
| 11,434,969 B2* | 9/2022 | Maton | F16F 9/0227 |
| 2002/0104723 A1 | 8/2002 | Obst | |
| 2012/0090931 A1 | 4/2012 | Krazewski et al. | |
| 2014/0069754 A1 | 3/2014 | Holden et al. | |
| 2016/0230835 A1* | 8/2016 | Groves | F16F 9/165 |
| 2017/0328438 A1* | 11/2017 | Osika | F16F 9/3214 |
| 2018/0195574 A1 | 7/2018 | Ishimaru et al. | |
| 2019/0162266 A1* | 5/2019 | Flacht | F16F 9/18 |
| 2021/0199172 A1* | 7/2021 | Maton | F16F 9/18 |
| 2021/0404528 A1* | 12/2021 | Kasprzyk | F16F 9/185 |
| 2022/0128114 A1* | 4/2022 | Malec | F16F 9/3221 |

FOREIGN PATENT DOCUMENTS

| | | | |
|---|---|---|---|
| EP | 3677809 A1 | 7/2020 | |
| JP | 51129585 A | 11/1976 | |
| JP | 57153804 U | 2/1984 | |
| JP | 60154601 U | 10/1985 | |
| JP | 62196432 A | 8/1987 | |

\* cited by examiner

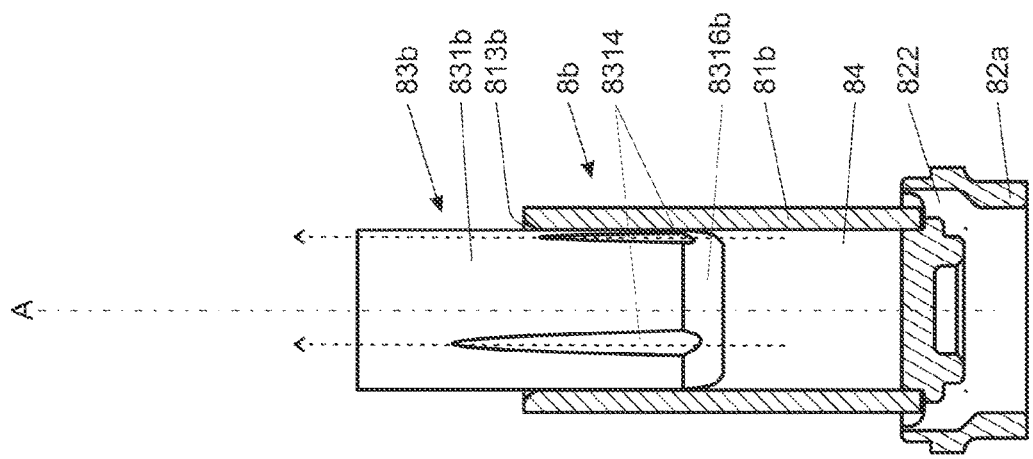
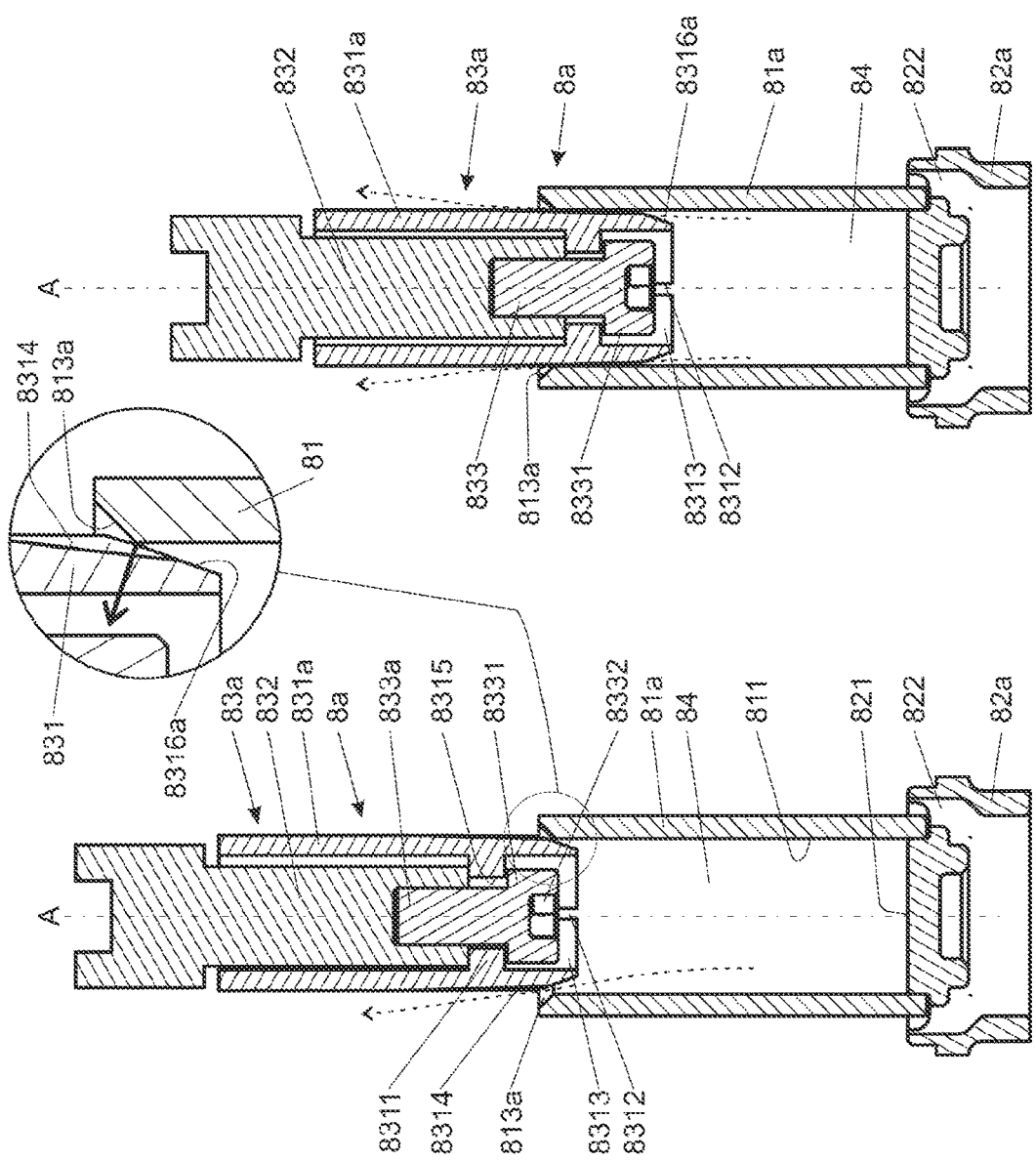

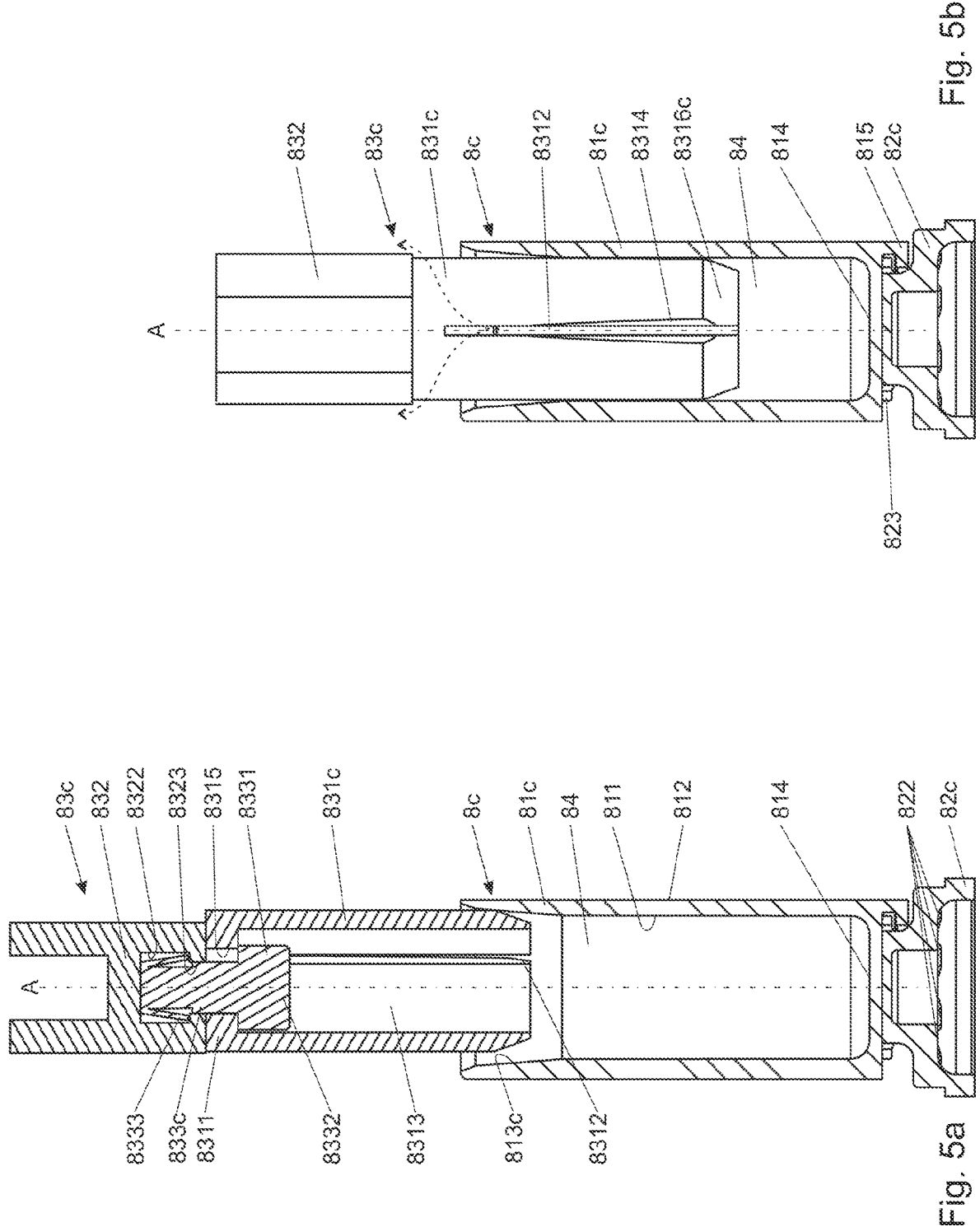

HYDRAULIC DAMPER WITH A HYDRAULIC COMPRESSION STOP ASSEMBLY

CROSS-REFERENCE TO RELATED APPLICATIONS

This application claims priority to Chinese Patent Application No. 202110399636.8, filed on Apr. 14, 2021, which is hereby incorporated by reference in its entirety.

FIELD OF THE INVENTION

The present invention relates to a hydraulic damper, in particular a motor vehicle suspension damper, comprising a main tube filled with working liquid; a main piston assembly disposed slidably inside the main tube along an axis, attached to a piston rod led outside the hydraulic damper through a sealed piston rod guide, dividing the main tube into a rebound chamber and a compression chamber, to control the flow of working liquid passing between the rebound chamber and the compression chamber; a base valve assembly located at the end of the compression chamber to control the flow of working liquid passing between the compression chamber and an additional compensation chamber; and a hydraulic compression stop assembly (HCS) located in the compression chamber and comprising an insert fixed on the base valve assembly, configured to allow the flow of fluid between the insert and the main tube through the base valve assembly, and provided with a first inner chamber, and an additional piston assembly displaceable along with the main piston assembly and apt to be introduced inside the first inner chamber of the insert at the end of the damper compression stroke to generate additional damping force.

BACKGROUND OF THE INVENTION

A hydraulic damper of this kind is disclosed, for example in the patent publication EP3499084. In order to improve durability of the HCS assembly at high velocities of the piston rod that high velocities may occur e.g. while a vehicle wheel hits an obstacle and induce a rapid increase of the pressure within the insert, which pressure may crack the insert or destroy other components of the HCS assembly, it comprises a second compression chamber located at least partially inside of the additional piston assembly, wherein a displaceable partition is disposed between the first and the second compression chamber.

Publication EP3244090 discloses a HCS assembly comprising an additional plastic piston snaplocked over the piston rod in an annular recess of the rod and capable of rotational and axial displacement within the limits of this snapping recess. The additional piston is provided with a number of preferably equiangularly spaced radially internal channels, and a number of preferably equiangularly spaced radially external channels, each having a cross-sectional surface in a plane perpendicular to the piston rod axis that decreases along the additional piston length and is the largest at its face distal to the main piston assembly.

It has been the object of the present invention to provide a hydraulic damper with a HCS assembly, which would be cost efficient and simple in manufacture and assembly, which would endure high pressures within the insert, and provide versatile tuning properties for shaping the additional damping force as a function of the tenon position within the insert, such that this additional damping force characteristic would be substantially monotonic and devoid of any undesirable peaks even at high velocities of the piston rod.

Yet another object of the present invention has been to provide a damper with a HCS assembly that would not require substantial modifications of the remaining components of a damper and might be employed as an add-on device in existing damper designs.

SUMMARY OF THE INVENTION

Therefore, a damper of the kind mentioned in the outset, according to the present invention is characterised in that said additional piston assembly comprises a piston rod extender fixed to the piston assembly or the piston rod at the side of the compression chamber, and a tenon fixed to said piston rod extender and radially displaceable with regard to said piston rod extender, wherein said tenon is terminated with a first entry surface having diameter monotonically diminishing towards the compression end of said tenon, while the insert is provided with a second entry surface having diameter monotonically increasing towards the rebound end of the insert.

This provides axial guidance of the tenon and smooth activation of the HCS assembly. Misaligned tenon shall always be displaced the axis due to the cooperation of the second entry surface of the insert and the first entry surface of the tenon and peak forces that may occur at the entry of the tenon into the insert are eliminated, even at high speeds of the tenon, when high level of the additional damping force is required.

Preferably said tenon has a substantially tubular shape and is provided with an internal annular recess defining an internal opening, wherein said additional piston assembly further comprises a mounting member provided with shank having diameter smaller than the diameter of said internal opening and fixed inside the piston rod extender along the axis, so that the internal annular recess of the tenon is disposed between the piston rod extender and a head of said mounting member.

This provides simplicity of the hydraulic compression stop assembly.

Preferably said tenon is provided with a number of, preferably equiangularly spaced, axially extending grooves, each having a cross-sectional surface that diminishes along the length of the groove towards the main piston assembly.

This provides smooth built-up and tunability of the damping force. Thanks to placing the grooves on the tenon, deep grooves can be made right at the first entry surface. On the other hand the insert devoid of the grooves features an improved durability and simplified construction.

Preferably said tenon is provided with a second inner chamber facing the first inner chamber of the insert.

This enables for a radial deflection of said tenon into said second inner chamber and thus improves axial guidance of the tenon.

Preferably said tenon is provided with at least one axially extending channel fluidly communicating said second inner chamber of said tenon with the compression chamber.

This also provides smooth built-up and tunability of the damping force.

Preferably said tenon is made of plastic.

This improves its deflection.

Preferably said insert is made of metal and is press-fitted to a metal fixing member fixed to the base valve assembly, wherein an inner cylindrical surface of said insert and an external wall of said fixing member define said inner chamber.

Alternatively preferably said insert is fixed to a fixing member fixed to the base valve assembly, wherein an inner cylindrical surface and a bottom surface of said insert define said first inner chamber.

Preferably said first entry surface of said tenon and/or said second entry surface of said insert is/are conical.

BRIEF DESCRIPTION OF THE DRAWINGS

The invention shall be described and explained below in connection with the attached drawings on which:

FIGS. 3a and 3b is a schematic cross-sectional view of the embodiment of the hydraulic compression stop assembly shown in FIG. 2 at the activation thereof (FIG. 3a) and at the further stage of the compression stroke (FIG. 3b);

FIG. 4 is a schematic cross-sectional view of another embodiment of the hydraulic compression stop assembly after its activation; and FIGS. 5a and 5b is a schematic cross-sectional view of yet another embodiment of the hydraulic compression stop assembly at the activation thereof (FIG. 5a) and at the further stage of the compression stroke (FIG. 5b).

DETAILED DESCRIPTION OF THE PREFERRED EMBODIMENTS

Figure 1:
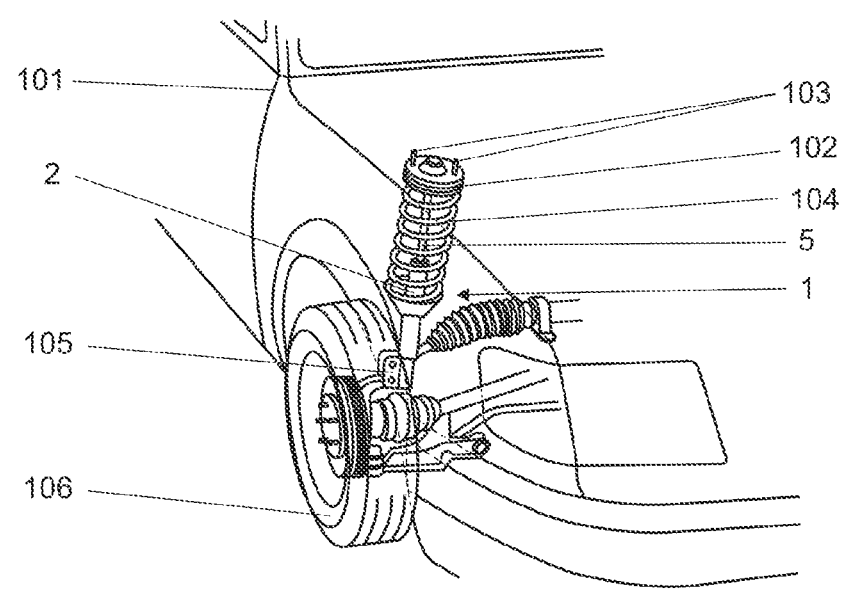
FIG. 1 illustrates a fragment of a vehicle suspension comprising the damper according to the present invention.

FIG. 1 schematically illustrates a fragment of an exemplary vehicle suspension comprising a damper 1 of the present invention attached to a vehicle chassis 101 by means of a top mount 102 and a number of screws 103 disposed on the periphery of the upper surface of the top mount 102. The top mount 102 is connected to a coil spring 104 and a piston rod 5 of the damper 1. The tube 2 of the damper 1 is connected to the steering knuckle 105 supporting the vehicle wheel 106.

Figure 2:
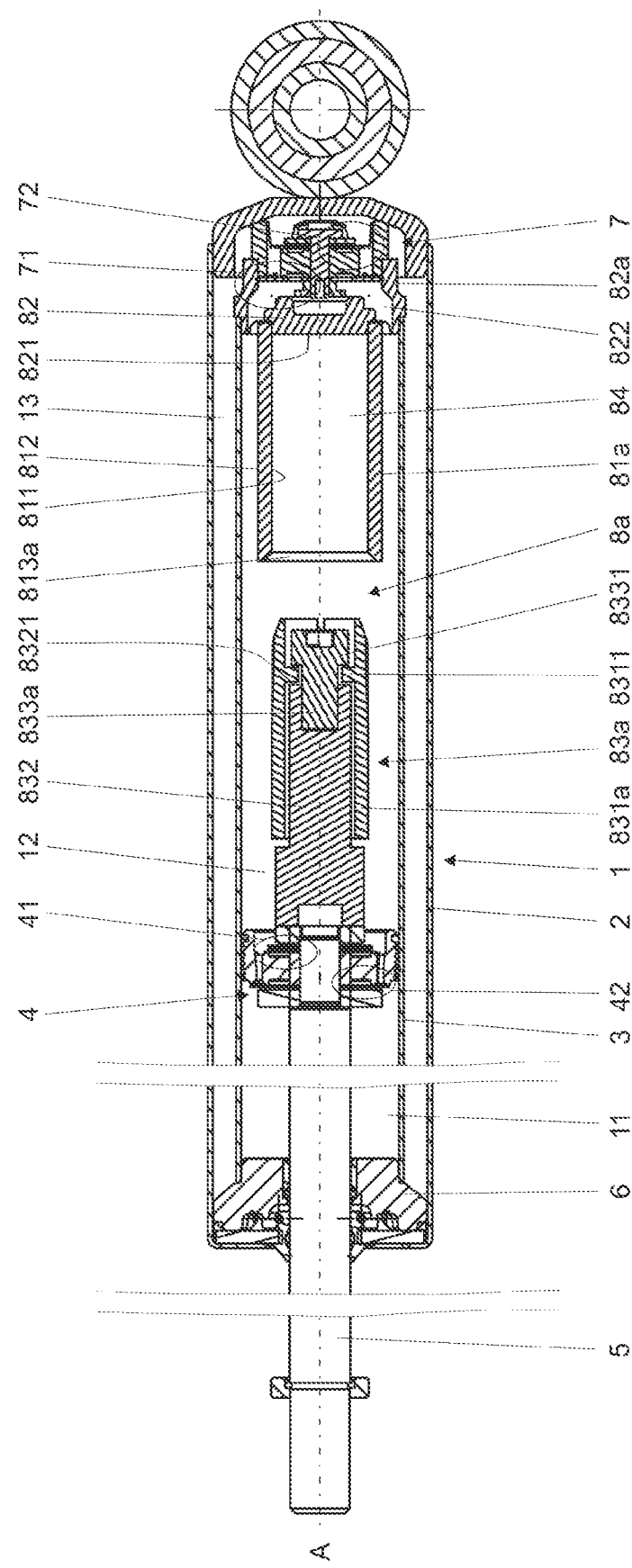
FIG. 2 is a schematic cross-sectional view of an embodiment of a twin-tube damper according to the present invention with an embodiment of a hydraulic compression stop assembly.

FIG. 2 presents an embodiment of a twin-tube damper 1 according to the present invention. The damper 1 comprises an external tube 2 and a main tube 3 filled with viscous working liquid inside of which a movable piston assembly 4 attached to a piston rod 5 led outside the damper 1 through a sealed piston rod guide 6 is disposed. The damper 1 is also provided with a base valve assembly 7 fixed at the other end of the main tube 3. The piston assembly 4 makes a sliding fit with the inner surface of the main tube 3 and divides the tube 3 into a rebound chamber 11 (between the piston assembly 4 and the piston rod guide 6) and a compression chamber 12 (between the piston assembly 4 and the base valve assembly 7). An additional compensation chamber 13 is located at the other side of the base valve assembly 7.

The piston assembly 4 is provided with compression 42 and rebound 41 valve assemblies to control the flow of working liquid passing between the rebound chamber 11 and the compression chamber 12 while the piston assembly 4 is in motion along an axis A. Also the base valve assembly 7 is provided with rebound 71 and compression 72 valve assemblies to control the flow of working liquid passing between the additional compensation chamber 13 and the compression chamber 12, respectively, during rebound and compression stroke of the damper 1. As it is well known to those skilled in the art, the valve assemblies 41, 42 and 71, 72 provide design parameters that may be used to shape desired characteristic of the twin-tube damper 1.

The damper 1 is further provided with a hydraulic compression stop assembly 8a located in the compression chamber 12 to generate an additional damping force at the end of the compression stroke e.g. in order to avoid abrupt stop of the piston assembly 4. Main components of the compression stop assembly 8a are an insert 81a and an additional piston assembly 83a. In this embodiment the insert 81a is fixed to the base valve assembly 7 by means of a sintered steel fixing member 82a press-fitted to the base valve assembly 7 and to the main tube 3. The insert 81a has a simple cylindrical shape and is made of metal by cold drawn method. The insert 81a is also press-fitted to the fixing member 82a. The insert 81a is provided with an inner cylindrical surface 811 that, along with an external wall 821 of the fixing member 82a, define a first inner chamber 84. The insert 81a has a radially external wall 812 distanced from the inner wall of the main tube 3, allowing the flow of fluid from the compression chamber 12 to the additional compensation chamber 13 (and in the opposite direction) between the insert 81a and the main tube 3 through a number of flow passages 822 in the fixing member 82a and the base valve assembly 7.

The reference numerals corresponding to the same functional elements remain the same throughout the description with suffixes (a, b, c) added, where appropriate to distinguish particular embodiments of the hydraulic compression stop assembly 8a, 8b, 8c.

The additional piston assembly 83a is displaceable along with the piston assembly 4 and comprises a piston rod extender 832, a tenon 831a and a mounting member 833. In this embodiment the piston rod extender 832 is fixed to the piston rod 5 at the side of the compression chamber 12. In other embodiments it could be fixed to the piston assembly 4.

The tenon 831a is made of plastic and has a substantially cylindrical shape with an internal annular recess 8311 defining an internal opening 8315. In this embodiment the mounting member has a form of a bolt 833a provided with torque applying means 8332 in a form of a hex key socket and screwed inside the piston rod extender 832 along the axis A. The internal annular recess 8311 of the tenon 831a is disposed between an axially external wall 8321 of the piston rod extender 832 and a head 8331 of the mounting bolt 833a. The diameter of the mounting bolt 833a shank is smaller than the diameter of the internal opening 8315 of the tenon 831a, so that the tenon 831a is to a certain extent radially displaceable with regard to the piston rod extender 832.

The external diameter of the tenon 831a substantially corresponds to the diameter of the inner cylindrical surface 811 of the insert 81a, wherein the tenon 831a is terminated with a first entry surface 8316a having diameter monotonically diminishing towards the compression end of the tenon 831a. In this embodiment the first entry surface 8316a of the tenon 831a is conical. The insert 81a, on the other hand, is provided with a second entry surface 813a having diameter monotonically increasing towards the rebound end of the insert 81a. In this embodiment the second entry surface 813a of the insert 81a is also conical.

In this embodiment the tenon 831a is provided with a second inner chamber 8313 defined behind the head 8331 of the mounting bolt 833a. An axially extending channel 8312 fluidly communicates the second inner chamber 8313 with the compression chamber 12.

Radially external surface of the tenon 831*a* is provided with four equiangularly spaced axially extending grooves 8314, each having a cross-sectional surface that diminishes along its length towards the main piston assembly 4. The axially extending channel 8312 is axially aligned with one of the grooves 8314.

As the tenon 831*a* enters the first inner chamber 84 of the insert 81*a* at the end of the compression stroke additional damping force is generated, as shall be explained below.

As shown in FIG. 3*a*, when the first entry surface 8316*a* of the tenon 831*a* contacts the second entry surface 813*a* of the insert 81*a* a reaction force, illustrated with an arrow in an enlarged fragment of the drawing, pushes the misaligned tenon 831*a* towards the axis A. This provides a smooth activation of the hydraulic compression stop assembly 8*a*. At the further stage of the stroke, shown in FIG. 3*b*, the tenon 831*a* makes a sliding fit with the insert 81*a* and the working liquid may flow out of the first inner chamber 84 to the compression chamber 12, as illustrated with dashed arrows, through the axially extending channel 8312 and through the grooves 8314. Diminishing cross-sectional surface of the grooves 8314 provides a smooth built-up of the damping force. Grooves 8314 begin at the first entry surface 8316*a* (cf. also FIG. 4).

Another embodiment of a compression stop assembly 8*b* shown in FIG. 4 is provided with a tenon 831*b* devoid of the axially extending channels 8312. As the tenon 831*b* makes a sliding fit with the insert 81*b* the working liquid may flow out of the first inner chamber 84 to the compression chamber 12, as illustrated with dashed arrows, solely through three equiangularly spaced axially extending grooves 8314 having a cross-sectional surfaces that diminish along their lengths towards the main piston assembly 4. The lengths of the grooves 8314 are differentiated to fine tune the built up of the damping force. A first entry surface 8316*b* of the tenon 831*b* and a second entry surface 813*b* of the insert 81*b* are substantially parabolic.

Yet another embodiment of a hydraulic compression stop assembly 8*c* is shown in FIGS. 5*a* and 5*b*. Here an insert 81*c* is made of metal and its inner cylindrical surface 811, along with bottom surface 814 define a first inner chamber 84. At its closed end the insert 81*c* is provided with a circumferential locking yoke 815 extending annularly about a half of the perimeter of the insert 81*c* and embracing a head 823 of a sintered steel fixing member 82*c* that is press-fitted to the base valve assembly 7 and to the main tube (not shown). The fixing member 82*c* is also provided with a number of equiangularly spaced axial channels 822 (cf. FIG. 5*a*) enabling fluid communication between the compression chamber 12 and the additional compensation chamber 13 through the base valve assembly 7 during the compression and the rebound stroke of the damper 1.

In this embodiment a tenon 831*c* of an additional piston assembly 83*c* is provided with an elongated second inner chamber 8313 extending over its entire length, so that an internal annular recess 8311 defining an internal opening 8315 defines the end wall of the tenon 831*c* distal from the insert 81. A first entry surface 8316*c* of the tenon 831*c* and a second entry surface 813*c* of the insert 81*c* are conical with the aperture smaller than in the embodiment 8*a*.

Furthermore a mounting member has a form of a plastic snap-fit member 833*c* having a hoop-strain annular projection 8333 engaging annular recess 8322 provided behind an internal opening 8323 of a piston rod extender 832.

As the tenon 831*c* makes a sliding fit with the insert 81*c* the working liquid may flow out of the first inner chamber 84*c* and the second inner chamber 8313 to the compression chamber 12, as illustrated with dashed arrows, solely through an axial channel 8312 fluidly communicating a second inner chamber 8313 of the tenon 831*c* with the compression chamber 12, as well as through an axially extending groove 8314 having a cross-sectional surface that diminishes along its length towards the main piston assembly 4 and is aligned with the axially extending channel 8312.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

LIST OF REFERENCE NUMERALS 1. damper
11. rebound chamber
12. compression chamber
13. compensation chamber
2. external tube
3. main tube
4. piston assembly
41. rebound valve assembly
42. compression valve assembly
5. piston rod
6. piston rod guide
7. base valve assembly
71. rebound valve assembly
72. compression valve assembly
8. hydraulic compression stop assembly
81. insert
811. inner cylindrical surface
812. radially external wall
813. second entry surface
814. bottom surface
815. locking yoke
82. fixing member
821. external wall
822. flow passage
823. head
83. additional piston assembly
831. tenon
8311. internal annular recess
8312. axially extending channel
8313. second inner chamber
8314. axial groove
8315. internal opening
8316. first entry surface
832. piston rod extender
8321. axially external wall
8322. annular recess
8323. internal opening
833. mounting member (833*a*. bolt, 833*c*. snap-fit member)
8331. head
8332. torque applying means
8333. hoop-strain projection
84. first inner chamber
101. vehicle chassis
102. top mount
103. screw
104. spring
105. steering knuckle
106. vehicle wheel

The invention claimed is:

1. A hydraulic damper (1), comprising:
a main tube (3) filled with working liquid;
a main piston assembly (4) disposed slidably inside the main tube (3) along an axis (A), attached to a piston rod (5) led outside the hydraulic damper (1) through a sealed piston rod guide (6), dividing the main tube (3) into a rebound chamber (11) and a compression chamber (12), to control the flow of working liquid passing between the rebound chamber (11) and the compression chamber (12);
a base valve assembly (7) located at the end of the compression chamber (12) to control the flow of working liquid passing between the compression chamber (12) and an additional compensation chamber (13); and
a hydraulic compression stop assembly (8) located in the compression chamber (12) and comprising:
an insert (81) fixed on the base valve assembly (7), configured to allow the flow of fluid between the insert (81) and the main tube (3) through the base valve assembly (7), and provided with a first inner chamber (84), and
an additional piston assembly (83) displaceable along with the main piston assembly (4) and apt to be introduced inside the first inner chamber (84) of the insert (81) at the end of the hydraulic damper compression stroke to generate additional damping force,
wherein said additional piston assembly (83) comprises: a piston rod extender (832) fixed to the main piston assembly (4) or the piston rod (5) at the side of the compression chamber (12), and a tenon (831) fixed to said piston rod extender (832) and radially displaceable with regard to said piston rod extender (832), and
wherein said tenon (831) is terminated with a first entry surface (8316) having diameter monotonically diminishing towards the compression end of said tenon (831), while the insert (81) is provided with a second entry surface (813) having diameter monotonically increasing towards the rebound end of the insert (81).

2. The hydraulic damper according to claim 1, wherein said tenon (831) has a substantially tubular shape and is provided with an internal annular recess (8311) defining an internal opening (8315), wherein said additional piston assembly (83) further comprises a mounting member (833) provided with shank having diameter smaller than the diameter of said internal opening (8315) and fixed inside the piston rod extender (832) along the axis (A), so that the internal annular recess (8311) of the tenon (831) is disposed between the piston rod extender (832) and a head (8331) of said mounting member (833).

3. The hydraulic damper according to claim 1, wherein said tenon (831) is provided with a number of axially extending grooves (8314), each having a cross-sectional surface that diminishes along the length of the groove (8314) towards the main piston assembly (4).

4. The hydraulic damper according to claim 3, wherein said tenon (831) is provided with a number of equiangularly spaced axially extending grooves (8314).

5. The hydraulic damper according to claim 1, wherein said tenon (831) is provided with a second inner chamber (8313) facing the first inner chamber (84) of the insert (81).

6. The hydraulic damper according to claim 5, wherein said tenon (831) is provided with at least one axially extending channel (8312) fluidly communicating said second inner chamber (8313) of said tenon (831) with the compression chamber (12).

7. The hydraulic damper according to claim 1 wherein said tenon (831) is made of plastic.

8. The hydraulic damper according to claim 1, wherein said insert (81a, 81b) is made of metal and is press-fitted to a metal fixing member (82a) fixed to the base valve assembly (7), wherein an inner cylindrical surface (811) of said insert (81a, 81b) and an external wall (821) of said fixing member (82a) define said first inner chamber (84).

9. The hydraulic damper according to claim 1, wherein said insert (81c) is fixed to a fixing member (82c) fixed to the base valve assembly (7), wherein an inner cylindrical surface (811) and a bottom surface (814) of said insert (81c) define said first inner chamber (84).

10. The hydraulic damper according to claim 1, wherein said first entry surface (8316a, 8316c) of said tenon (831a, 831c) is conical.

11. The hydraulic damper according to claim 1, wherein said second entry surface (813a, 813c) of said insert (81a, 81c) is conical.

12. The hydraulic damper according to claim 1, wherein the hydraulic damper (1) is a motor vehicle suspension damper.

* * * * *